No. 12,778. REISSUED APR. 7, 1908.
P. BONVILLAIN.
APPARATUS FOR GRINDING OR CRUSHING FOUNDRY SAND, &c.
APPLICATION FILED DEC. 27, 1907.
2 SHEETS—SHEET 1.
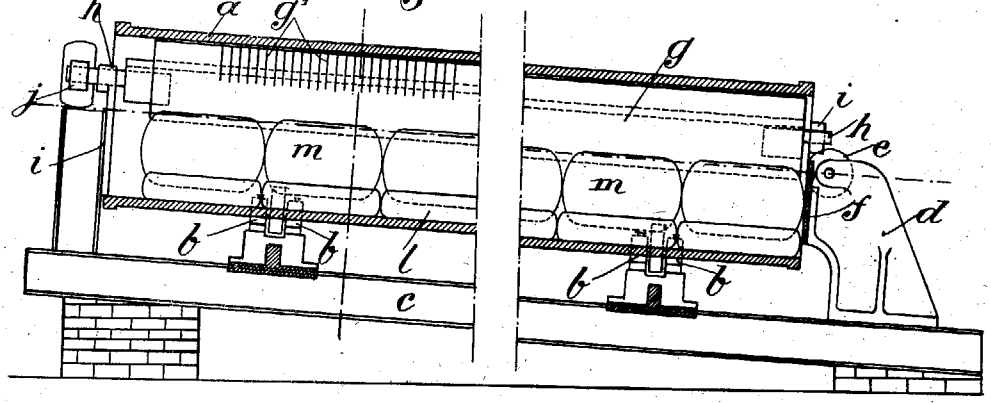
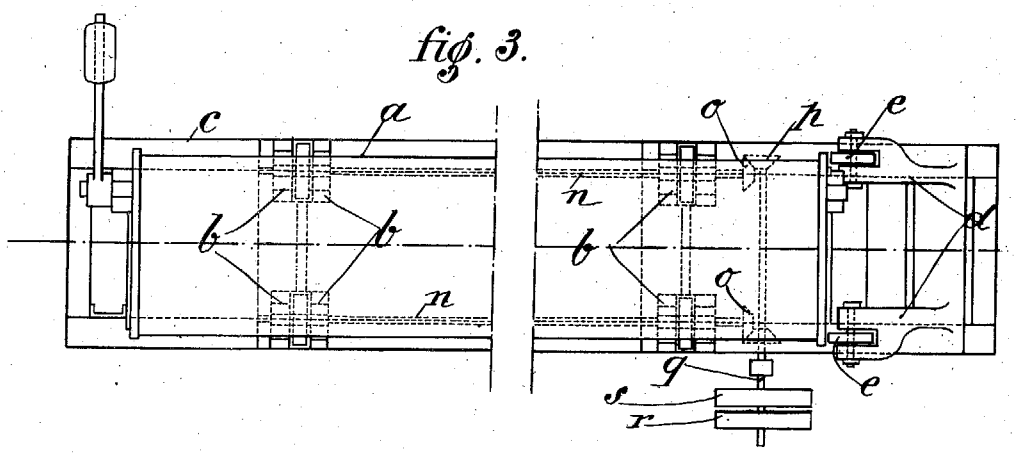
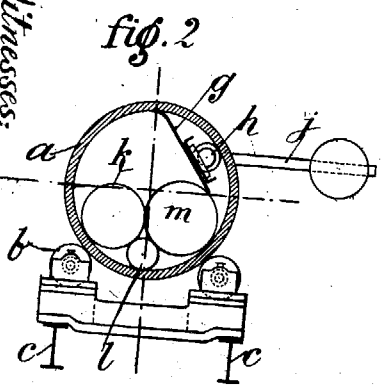
Witnesses:
Harvey L. Lechner
Archwoitt Martin
Inventor:
Philibert Bonvillain
by atty Paul Synnestvedt No. 12,778. REISSUED APR. 7, 1908.
P. BONVILLAIN.
APPARATUS FOR GRINDING OR CRUSHING FOUNDRY SAND, &c.
APPLICATION FILED DEC. 27, 1907.
2 SHEETS—SHEET 2.
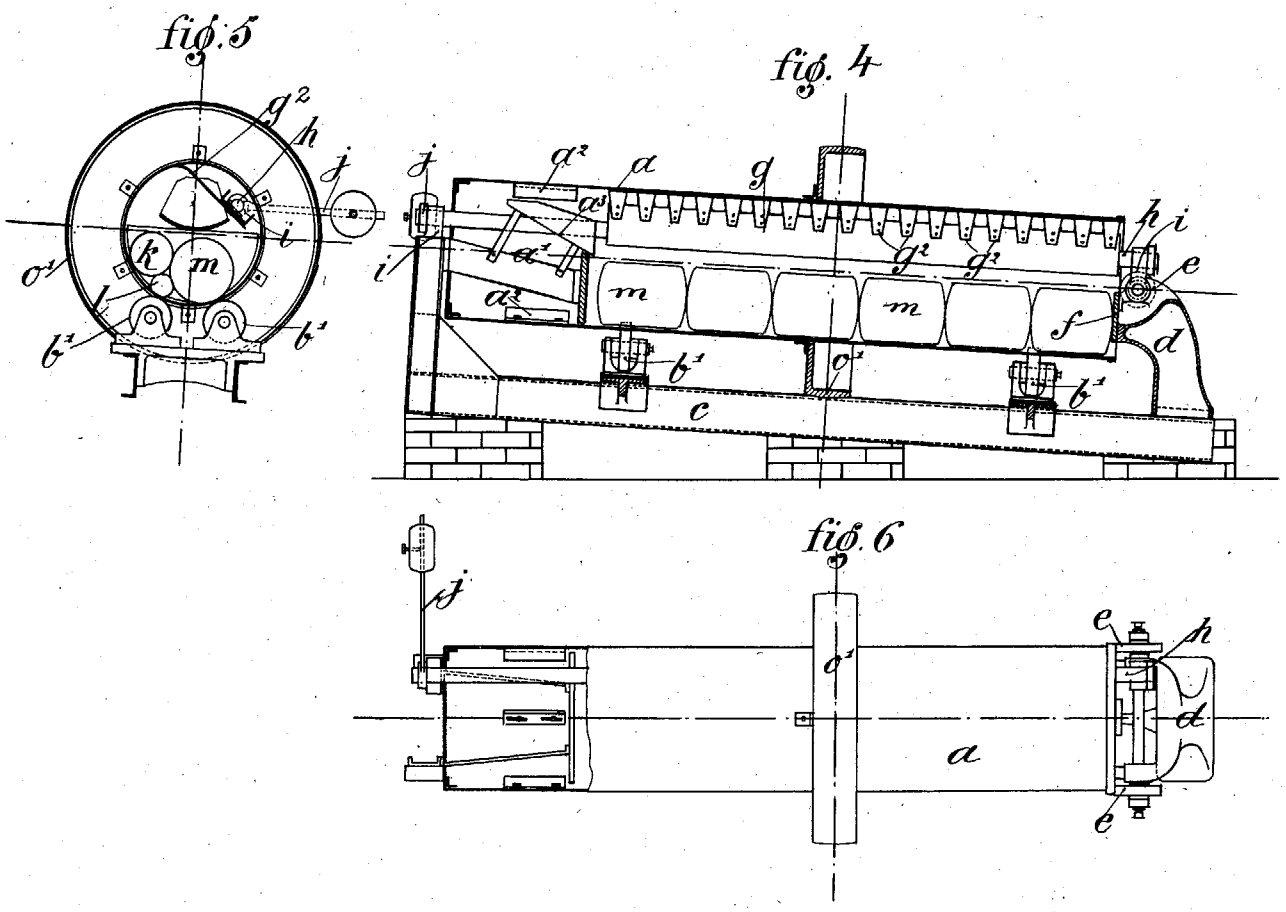
Witnesses:
Harvey L. Lechner
Archworth Martin
Inventor:
Philibert Bonvillain
by atty
Paul Synnestvedt

UNITED STATES PATENT OFFICE.

PHILIBERT BONVILLAIN, OF PARIS, FRANCE, ASSIGNOR, BY MESNE ASSIGNMENTS, TO E. H. MUMFORD COMPANY, OF PHILADELPHIA, PENNSYLVANIA, A CORPORATION OF PENNSYLVANIA.

APPARATUS FOR GRINDING OR CRUSHING FOUNDRY-SAND, &c.

No. 12,778. Specification of Reissued Letters Patent. Reissued Apr. 7, 1908.

Original No. 810,904, dated January 30, 1906, Serial No. 210,748. Application for reissue filed December 27, 1907. Serial No. 408,321.

*To all whom it may concern:*

Be it known that I, PHILIBERT BONVILLAIN, a citizen of the Republic of France, and a resident of Paris, France, have invented certain new and useful Improvements in or Relating to Apparatus for Grinding or Crushing Foundry-Sand or other Similar Material, of which the following is a specification.

This invention relates to apparatus for grinding or crushing wet granular material, such as foundry-sand.

In the accompanying drawings, which illustrate by way of example, a crusher according to this invention, Figure 1 is a longitudinal section of the crusher; Figure 2, a cross-section, and Figure 3 is a plan corresponding to Figure 1. Figure 4 is a longitudinal section of a modified form of crusher. Figure 5 is a cross-section, and Figure 6 is a plan view corresponding with Figure 4.

The crusher comprises a hollow cylinder *a*, the axis of which is inclined at an angle to the horizontal. It rests on several pairs of rollers *b b*, the brackets of which are mounted on a suitable frame *c*. A support *d*, mounted on the frame *c* near the lower end of the cylinder *a*, carries rollers *e e*, against which rests the corresponding edge of the cylinder *a*. The rollers *e e* keep the cylinder in position as it bears against them during its rotation. On the support *d* a plate *f* is arranged so that it partially closes the lower end of the cylinder *a*. The interior of the cylinder is provided with a scraper *g*, comprising a sheet-metal plate provided at its ends with trunnions *h*, carried by brackets *i*, a lever *j* having a balance-weight *v* being mounted on the end of one of the trunnions *h* and tending to force the upper edge of the scraper against the inner wall of the cylinder *a*, as shown in Figure 2.

In the interior of the cylinder are arranged three series of cylindrical rollers *k l m* of different diameters, which owing to their weight always keep in the lower portion of the cylinder *q* and are tangential to each other, or nearly so.

In the construction shown in Figures 1, 2 and 3 the rollers *b b* are arranged in pairs on each side of the cylinder, those on the same side being mounted on one and the same spindle *n*. The spindles *n n* are each provided with beveled pinions *o o*, engaging with pinions *p p*, mounted on a spindle *q*, provided at one of its ends with a loose pulley *r* and a fast pulley *s*. The pulley *s* is driven from any motor by means of a belt and transmits movement to the pinions *p p*, mounted on the same spindle, said pinions driving the pinions *o o*, the spindles *n n*, and the rollers *b b*, the result being that the cylinder *a* is caused to rotate while its lower end bears against the rollers *e e*. The cylinder *a* may be mounted and rotated in any other suitable manner. For instance, it may be supported on rollers *b′ b′*, Figures 4 and 5, and provided centrally with a toothed ring or pulley *o′* driven in any convenient manner. The series of rollers *k l m* may extend the whole length of the cylinder *a*, as in Figure 1, or a space *a′* may be left at the upper end of the cylinder, into which the sand is introduced by hand or mechanically through the open end of or through an opening in the end of the cylinder. The sand thus receives a preliminary mixing in this chamber before it is carried up in the rotation of the cylinder by scoops $a^2$ and deposited upon an inclined delivery-plate $a^3$, from whence it descends to the crushing-rolls. The sand, owing to its wet state, adheres to the inner face of the cylinder and is carried round by it in its rotation, but is detached from it at the upper generatrix by the scraper *g*, and then it falls between the rollers *k l m*, which crush it again and again. As the rollers *k l m* are of different diameters, they necessarily have different speeds of rotation, and the result is that there is friction between them, which assists the grinding of the sand.

It must be pointed out that, owing to the inclination of the cylinder *a*, each particle of sand is carried away by it in an oblique plane, while, owing to the action of the scraper *g*, these particles fall down in a vertical direction, owing to the action of gravity. The result is that all the particles of sand advance continuously until they leave the cylinder, making their exit through the aperture between the bottom edge of the plate *f* and the lower edge of the cylinder *a*. The plate *f*, as will be seen, retains the rollers *k l m*, which otherwise would come out of the cylinder, owing to its inclination. The scraper $g$ can be divided by means of saw-cuts into narrow or flexible portions or sections $g'$ after the manner of a comb, so as to secure its better contact with the inner wall of the cylinder $a$. It may also be formed of a series of small flexible overlapping plates $g^2$, riveted in place upon a plate $g$, as shown in Figures 4 and 5, and these are arranged to contact with the surface to be scraped, same as in the construction shown in Figure 1. The balance-weight $v$ is adjustable on the lever $j$, so that its position can be suitably regulated.

This crusher can be used for treating sand of various kinds, as well as any other pulverulent products.

Having now particularly described and ascertained the nature of my said invention and in what manner the same is to be performed, I declare that what I claim is—

1. In a sand mill, the combination with a hollow rotatable cylinder having its axis inclined and provided on its interior with crushing means, of a longitudinally extending scraper engaging the upper interior surface of the cylinder.

2. In a sand mill, the combination with an inclined hollow rotatable cylinder provided at its interior lower portion with independent crushing rolls, of a longitudinally extending scraper engaging the interior upper surface of the cylinder in such position that the sand scraped from the cylinder will drop between the rolls.

3. In a sand mill the combination with a hollow rotatable cylinder, of a pair of crushing rolls in the lower portion thereof engaging each other and the wall of the cylinder, and a third roll engaging said rolls and the wall of the cylinder.

In testimony whereof I have hereunto signed my name in the presence of the two subscribing witnesses.

PHILIBERT BONVILLAIN.

Witnesses:
DEAN B. MASON,
JULIEN EAUERNE.